Patented Aug. 20, 1940

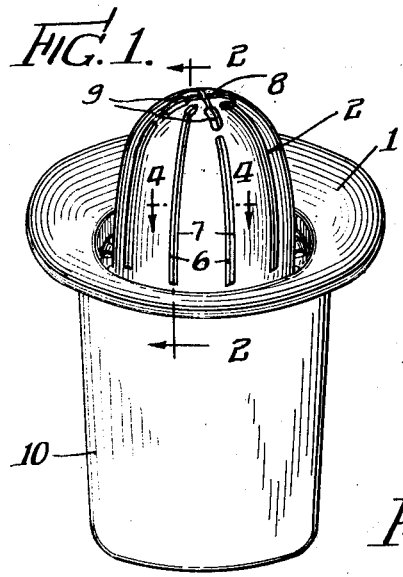
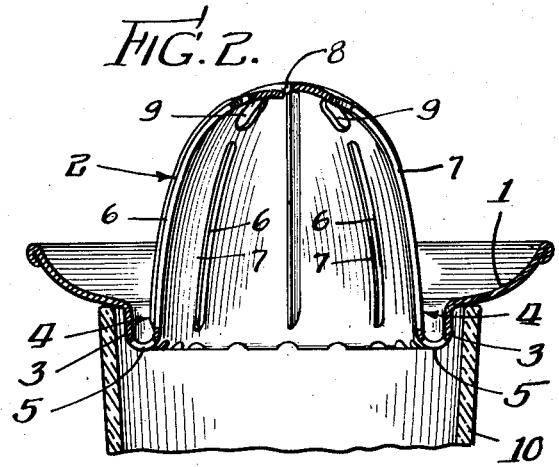
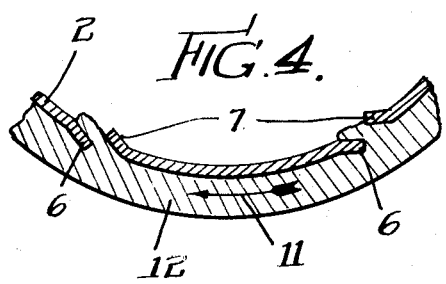
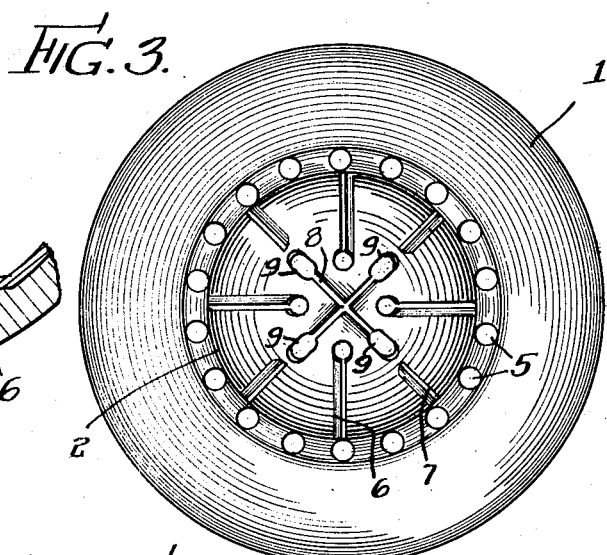
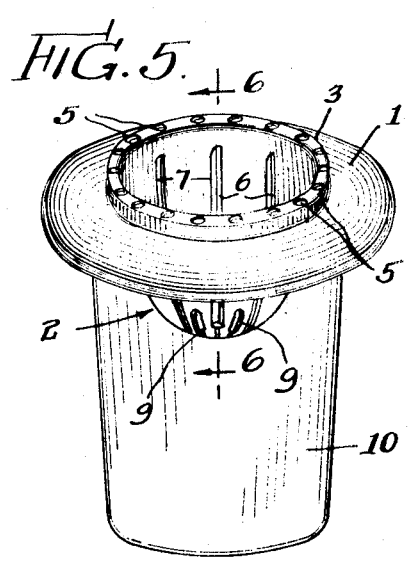
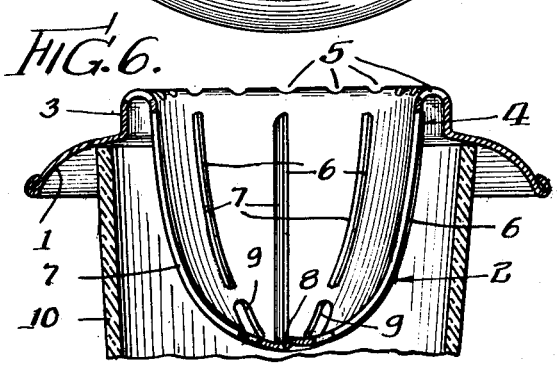
INVENTOR.
Lewis H. Scurlock
BY:
Arthur H. Durand
ATTORNEY.

2,212,328

UNITED STATES PATENT OFFICE 2,212,328

SEPARATOR AND EXTRACTOR

Lewis H. Scurlock, Chicago, Ill., assignor of one-half to Nolen H. McCleary and Edward P. Russell, Chicago, Ill.

Application February 18, 1939, Serial No. 257,182

5 Claims. (Cl. 146—3)

This invention relates to devices for separating or extracting juice from lemons or oranges, or other fruits, and for separating or extracting the white of an egg from the latter.

Generally stated, the object of the invention is to provide a simple and comparatively inexpensive device of this kind, preferably made from sheet metal or similar material, that can be placed on the top of a tumbler or glass or similar receptacle, with an annular bottom portion depending a distance below the top of the glass, forming a gutter that is U-shaped in cross section, and having a perforated dome whereon the lemon or orange or other similar fruit can then be manipulated to separate or extract the juice therefrom, so that the juice from the fruit is discharged downwardly from the under side of said device into the said receptacle, and which can also be used upside down on the glass or other receptacle for separating the white from the yolk of an egg, so that the white will drain through into the glass.

It is also an object to provide certain details and specific features of construction tending to increase the general efficiency and desirability of a hand separator or extractor of this particular character.

To the foregoing and other useful ends, the invention consists in matters hereinafter set forth and claimed and shown in the accompanying drawing, in which—

Fig. 1 is a perspective of the device embodying the principles of the invention, showing the same in position on the top of a tumbler or glass, for use in extracting the juice from a lemon or orange, or similar fruit.

Fig. 2 is a vertical section, on a larger scale, on line 2—2 in Fig. 1 of the drawing.

Fig. 3 is a top plan view of said device.

Fig. 4 is an enlarged detail fragmentary sectional view on line 4—4 in Fig. 1 of the drawing.

Fig. 5 is a view similar to Fig. 1, showing the separating and extracting device turned upside down, or reversed, for the purpose of separating the white from the yolk of an egg.

Fig. 6 is an enlarged vertical section on line 6—6 in Fig. 5 of the drawing.

As thus illustrated, the invention comprises a round device preferably formed of sheet metal, although there may be other materials that would also serve the purpose, such as thin glass or porcelain of a tough nature, which would not be subject to breakage, but because of such danger with materials of that kind, metals such as aluminum are preferable for this purpose.

The said device has a round, saucer-like rim portion 1, and a raised and dome-shaped middle portion 2, the depending inner edge portion 3 of the saucer-like rim portion being spaced a distance from the lower side portions of the said dome-like portion, as shown more clearly in Fig. 2 of the drawing, thus forming a depending annular gutter on the bottom of the device, the outer wall of said gutter being spaced a distance from the outer edge of said saucer, so that the depending gutter sets down in the glass as shown in Fig. 2 of the drawing. The bottom of the space 4 is preferably provided with openings 5, as shown. The sides of the dome-shaped portion are provided with slots extending up and down the sides thereof, one edge 6 of each slot being turned outwardly, and the other edge 7 being turned inwardly, if desired, in the manner shown. In addition, the top of the dome may have a cross shaped slot 8, with openings 9 at the ends of this slot. If desired, the edges of the slot 8 can be formed to cut the pulp clean from the inside of the rind. Some of the slots having the edges 6 and 7 are enlarged at their upper ends, and the others are shorter. The lower side of the saucer-like rim portion 1 is adapted to rest upon the upper edge of a goblet or glass 10, as shown in Fig. 2 of the drawing, and the sides 3 are at such time preferably spaced a distance from the sides of the goblet or glass, as shown in the drawing, although the sides 3 may bear against the inner surface of the goblet or glass, to center the device thereon, without interfering with the desired mode of operation of the device.

As thus constructed, and when thus placed upon a goblet or glass, the half of a lemon, or of an orange, can be manipulated by hand on the dome portion 2, by bearing down and rotating the same in the direction of the arrow 11 shown in Fig. 4 of the drawing, so that the rind 12 of the lemon or orange will have its interior scraped clean, thus not only extracting the juice from the fruit, but the pulp as well, the edges 6, previously mentioned, serving to cut the pulp out perfectly clean.

When used for separating or extracting the white from an egg, the device is preferably turned upside down and placed upon the glass or tumbler, as shown in Figs. 5 and 6 of the drawing. In this way, when an egg is broken into the inverted dome-shaped portion of the device, it is found that the white of the egg will strain through the slits or slots in the sides of the dome, and through the openings 8 and 9, leaving the yolk unbroken in the cavity provided by the inverted dome-shaped portion of the device.

The two uses for the device, as pointed out, are important, and are illustrative of the way in which the device can be used for two purposes, and it will not be necessary to name other uses which are obvious, or which may be discovered from time to time, for a device embodying the invention shown and described.

Various modifications can be made, of course, without departing from the spirit of the invention. For example, the holes 9 are preferably oblong, as shown, but it is obvious that they can be of any suitable or desired shape, like the other holes, and still be within the scope of the invention broadly.

It will be seen that the discharge openings 5 are formed in the round bottom of an annular depending portion which is U-shaped in cross section, when the device is right side up. Thus the round bottom of this depending portion is lowermost of the device, when the latter is right side up, as shown in Fig. 2 of the drawing, and is uppermost of the device when the latter is upside down, as shown in Fig. 6 of the drawing. Again, it will be seen that the up-turned edge of the saucerlike rim I is a substantial distance beyond the outer side of the glass, in either position of said device, as shown in the drawing. In this way, juice and pulp can flow down the outer side of the middle or central dome-shaped portion 2, when in the position shown in Fig. 2 of the drawing, and such juice or pulp will be collected in the annular gutter formed by the space at the base of the dome, and will then be discharged downwardly through the openings 5 in the round bottom of this gutter. In this way the openings 5 are of a size and capacity to prevent the juice and pulp from overflowing the edge of the saucer-like rim I of the device, when used as shown in Fig. 2 of the drawing. At the same time, when the device is used for separating the white from an egg, as shown in Fig. 6 of the drawing, the openings 5 are then uppermost of the device and are beyond the reach of any portion of the egg, so that the white will be drained through the sides and bottom of the dome, into the glass or tumbler, leaving the yolk intact in the upside down device. When it is stated that the bottom of the gutter is round in cross section, all that is meant, of course, is that the said bottom is rounded more or less in order to avoid corners in which pulp and juice might collect.

It is obvious, of course, that the said gutter can be either shallow or deep, more or less, without departing from the spirit of the invention.

Furthermore, it will be seen that the device is adapted to center itself on glasses or tumblers or other containers of different diameters. This is because the under side of the saucer-like rim I is convex, and hence the device will center itself on any glass that is a little larger in diameter than the portion 3 and a little less in diameter than the diameter of the said saucer-like rim.

When right side up, the convexity of the rim I will center the device on glasses of different diameters; and when upside down, the concavity of said rim will center the device on glasses of different diameters.

It will be seen therefore that the said gutter around the base of the dome, depending a substantial distance downwardly from the annular inner edge of the saucer, is an important feature, as it serves not only to collect and drain the juice into the glass or tumbler, when the device is rightside up, but serves also to support the dome or rim on the inner edge of the saucer, and in effect increases the height of the dome, and is of advantage in the use of the device either right side up or right side down.

What I claim as my invention is:

1. A device for the purpose disclosed, comprising a section of sheet metal having a portion forming a round imperforate saucer curving upwardly to form an upturned outer edge, a hollow perforate gutter of substantial capacity on the bottom of said device, depending downward a distance from the annular inner edge of said saucer, so that the saucer may repose on ordinary glasses or tumblers of different diameters, with the bottom of the gutter rounded downward in cross section, and a perforate cutting dome rising from the inner side of said gutter, so that the latter is well down inside when the saucer is placed on the upper edge of a glass or tumbler, all formed of one integral piece of sheet metal, and with said gutter lowermost when the device is rightside up on a glass.

2. A structure as specified in claim 1, said dome having means to separate the white from an egg, when placed upside down on the glass or tumbler, with said gutter then uppermost, said gutter at such time forming a high rim for the cup formed by the inverted dome.

3. A structure as specified in claim 1, said dome having slots therein converging upwardly from said gutter, with some holes in the top of the dome, and said gutter having holes in the rounded bottom thereof, with said slots extending down into the gutter.

4. A structure as specified in claim 1, the inner and outer side wall of said gutter being spaced a substantial distance apart and practically vertical.

5. A structure as specified in claim 1, the inner and outer side walls of said gutter being spaced a substantial distance apart and practically vertical, the inside wall and bottom of the gutter being perforate, and the outer side wall thereof being imperforate.

LEWIS H. SCURLOCK.